Patented Aug. 4, 1936

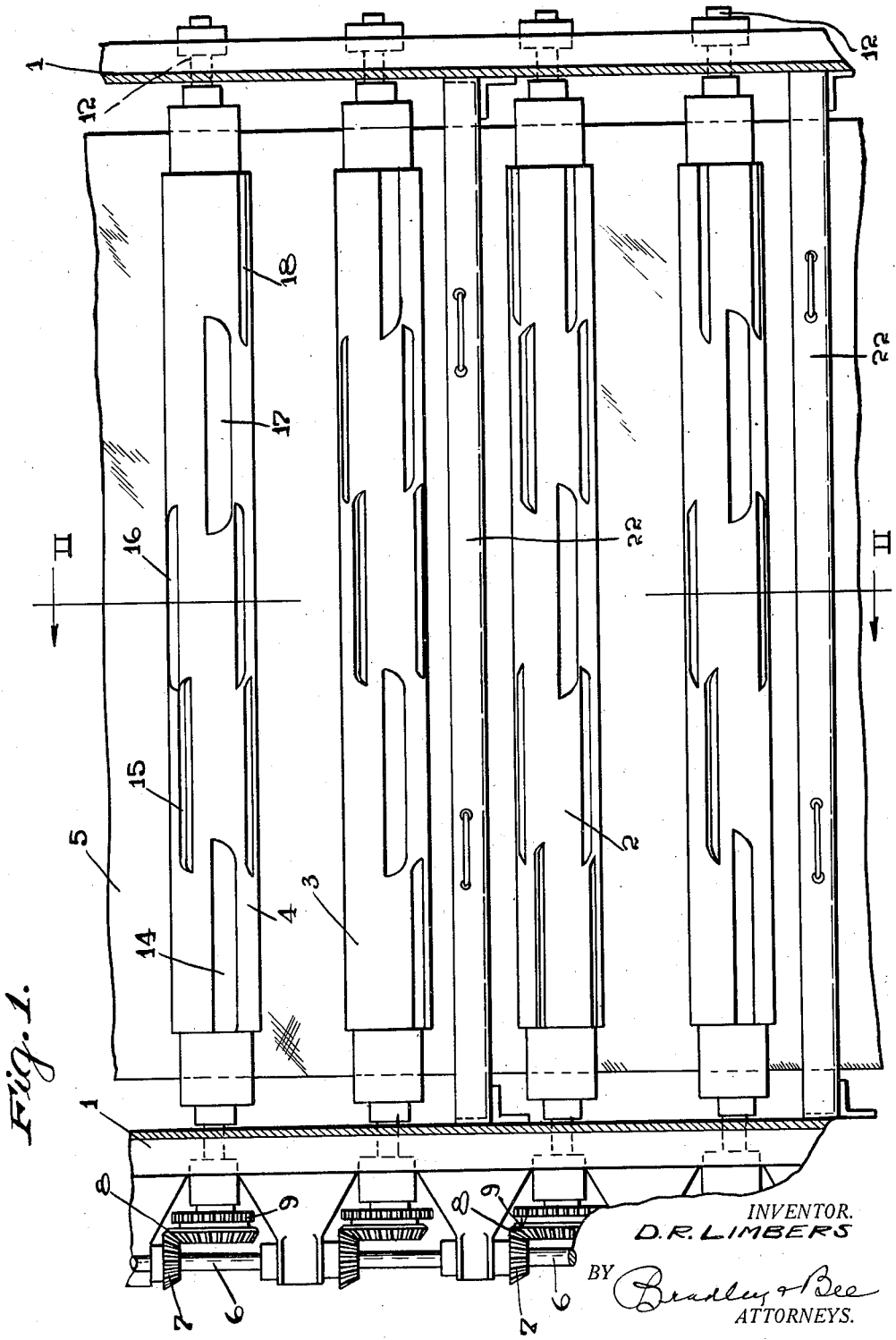

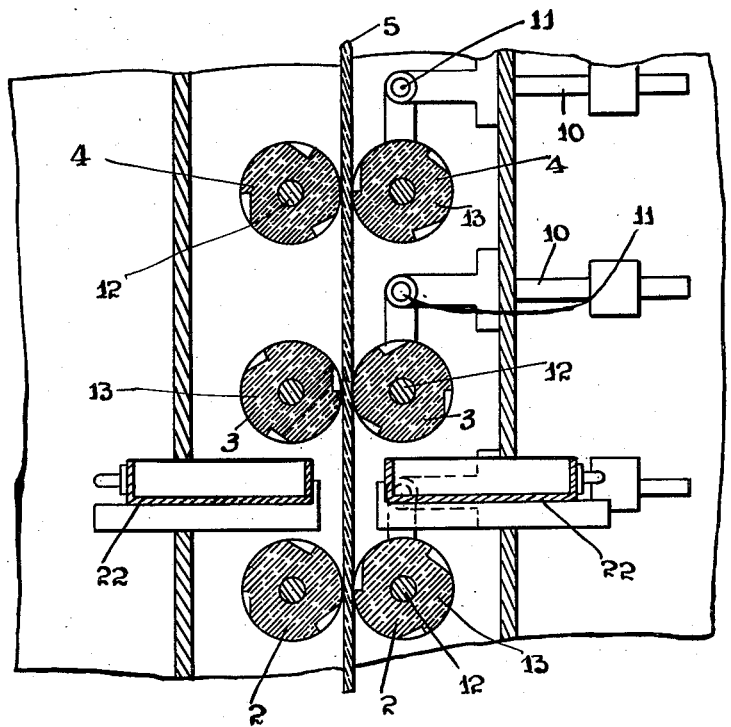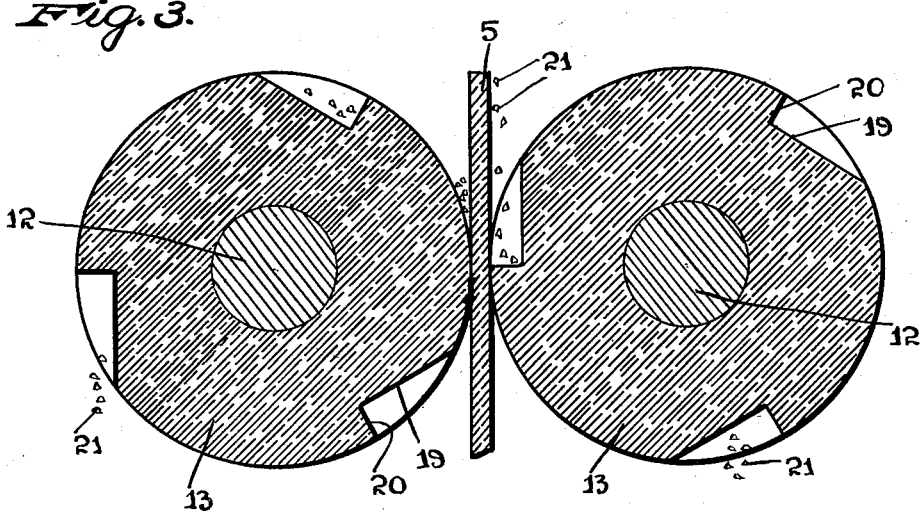

2,049,505

UNITED STATES PATENT OFFICE 2,049,505

APPARATUS FOR DRAWING GLASS

Don R. Limbers, Clarksburg, W. Va., assignor to Pittsburgh Plate Glass Company, Allegheny County, Pa., a corporation of Pennsylvania Application July 26, 1935, Serial No. 33,203

3 Claims. (Cl. 49—17)

The invention relates to drawing glass upward in a continuous ribbon, such as is done in the well-known Fourcault and Slingluff systems and involves an improvement upon the construction shown in the patent to J. A. Sweet No. 1,698,378, dated January 8, 1929. This apparatus employs a series of pairs of driven rollers, having surfaces of somewhat yielding material, such as molded asbestos, which grip the sheet and draw it upward continuously through a leer casing, the glass being cut off in lengths as it emerges from the top of the apparatus. In the use of such an apparatus, there is a certain amount of breakage from time to time in the upper part of the leer casing, the sheet sometimes cracking longitudinally and sometimes transversely.

The larger pieces of glass which crack off are fed upward by the rollers and are readily removed at the top, but the chips or small particles, which are broken away, are difficult of removal and work their way down along the sheet between such sheet and the rolls, where they accumulate and scratch the oncoming sheet. Some of these particles also get past the rolls and are picked up by the hot glass at the base of the sheet, adhering thereto and marring its surface. Chips are also formed when the glass is severed above the casing, and such chips also fall down between the rolls, and cause the same trouble, as above pointed out, with respect to the chips formed by breakage. The present invention involves an expedient for getting rid of the chips which fall down between the rolls, this being accomplished by providing grooves longitudinally in the surfaces of the rolls, into which the chips fall, and are carried by the rotation of the rolls to the rear sides thereof, where they are dumped by gravity into suitable receptacles placed below the level of the rolls.

In the Sweet apparatus, the grooves are arranged spirally in the rolls extending from one end thereof to the other end and have a tendency to roll some of the small particles of glass crosswise of the sheet producing small hair line scratches on the sheet. Further the spiral grooves tend to produce roll marks on the glass, and in practice the edges of the grooves become rounded in service due to the wearing away of the asbestos, and these rounded edges tend to roll particles of glass in contact with the glass without picking them up, thus additionally scratching the glass in some cases.

The present improvement, while accomplishing the same result as the Sweet construction, avoids the foregoing objections. The grooves are in parallel with the axis of the rolls, and of relatively short length, so that any tendency to feed the glass particles along the rolls is avoided and no roll marks are produced incident to the use of the grooves. There is also less tendency of the edges of the grooves to wear away or crush and become rounded, so that any scratching incident to rolling particles of glass circumferentially of the rolls is reduced to a minimum. The weakening of the roll structure incident to the relatively short staggered grooves is less than with long spiral grooves, and as a result, rolls employing the improved structure give a longer period of service than those employing the construction of the Sweet patent. One embodiment of the invention is illustrated in the accompanying drawings, wherein:

Figure 1 is a vertical section through a portion of the drawing apparatus. Fig. 2 is a section on the line II—II of Fig. 1. And Fig. 3 is an enlarged section on the line II—II of Fig. 1.

Referring to the drawings, 1 is a portion of the leer casing, in which are mounted the pairs of rolls 2, 2, 3, 3, 4, 4, etc., and 5 is the glass sheet which is being drawn. The rolls are all driven from the vertical drive shaft 6 at one side of the leer casing provided with the gears 7 which mesh with the gears 8 carried by the axles of the rolls which lie on one side of the glass sheet. The other set of rolls is driven by means of spur gears 9 which mesh with similar spur gears on the opposing rolls, this being a drive well known in the art. One member of each pair of rolls is mounted upon a bell crank lever 10 pivoted at 11 and counterweighted so that the roll is pressed yieldingly toward the other roll.

The rolls comprise the axles 12, 12 covered with asbestos cylinders 13, 13 which are molded on the axles 12, 12 and are relatively hard and compact, the quality of asbestos required for this service being well-known in the art. Each of the rolls as illustrated is provided with five sets of longitudinal grooves 14, 15, 16, 17, and 18 which are parallel with the axis of the roll, each set comprising three grooves spaced equally around the periphery of the roll as will be seen by reference to Figs. 2 and 3. The grooves of adjacent sets are in staggered relation with the ends of each set overlapping the ends of the next set as will be seen by reference to Fig. 1.

The grooves are approximately V-shaped in cross section with the walls 19 and 20 thereof of unequal length, such walls being at right angles to each other with the short wall 20 arranged radially with respect to the roll. Pockets are thus provided in which any loose particles of glass 21 are caught, as the rolls revolve, and carried away from the glass sheet. Pans 22, 22 are provided in the leer for catching these particles as the rolls revolve. These pans may be removed and emptied as occasion requires. As heretofore explained, the construction as described and illustrated collects and removes particles of glass with practically no scratching of the glass sheet or ribbon. Since the grooves are parallel with the axis of the roll, there is no tendency to feed the glass particles longitudinally of the roll, and it has been found in practice that grooves of the kind illustrated of relatively short length do not noticeably mark the glass, as is the case with a spiral groove which extends from one end of the roll to the other, as in the patent heretofore referred to. I have also found that with grooves of the character shown and described, the corners of the grooves do not become rounded in a short period of time, so that after an extended period of service, the short end walls 20 will still pick up the glass particles without rolling them longitudinally of the glass sheet. Other advantages incident to the construction will be readily apparent to those skilled in the art.

What I claim is:

1. In combination in a glass sheet drawing apparatus, a plurality of sets of traction rolls arranged in series for gripping the glass therebetween, one of such rolls being provided with a plurality of sets of grooves in parallel with the axis of the roll, the grooves of each set being in spaced relation circumferentially of the roll, and the sets being arranged in series along the length of the roll with the grooves of each set in staggered relation with the grooves of the next set.

2. In combination in a glass sheet drawing apparatus, a plurality of sets of traction rolls arranged in series for gripping the glass therebetween, one of such rolls being provided with a plurality of sets of grooves in parallel with the axis of the roll, the grooves of each set being in spaced relation circumferentially of the roll, and the sets being arranged in series along the length of the roll with the grooves of each set in staggered relation with the grooves of the next set and with their adjacent ends overlapping.

3. In combination in a glass sheet drawing apparatus, a plurality of sets of traction rolls arranged in series for gripping the glass therebetween, one of such rolls being provided with a plurality of sets of grooves in parallel with the axis of the roll, the grooves of each set being in spaced relation circumferentially of the roll, and the sets being arranged in series along the length of the roll and distributed over the area of the roll with the grooves of each set in staggered relation with the grooves of the next set, said grooves being of V-shape with the walls thereof at approximate right angles to each other and with one wall shorter than the other and extending radially of the roll.

DON R. LIMBERS.